No. 646,238. Patented Mar. 27, 1900.
J. T. SCHNORR.
SHEARS.
(Application filed Oct. 11, 1899.)
(No Model.)
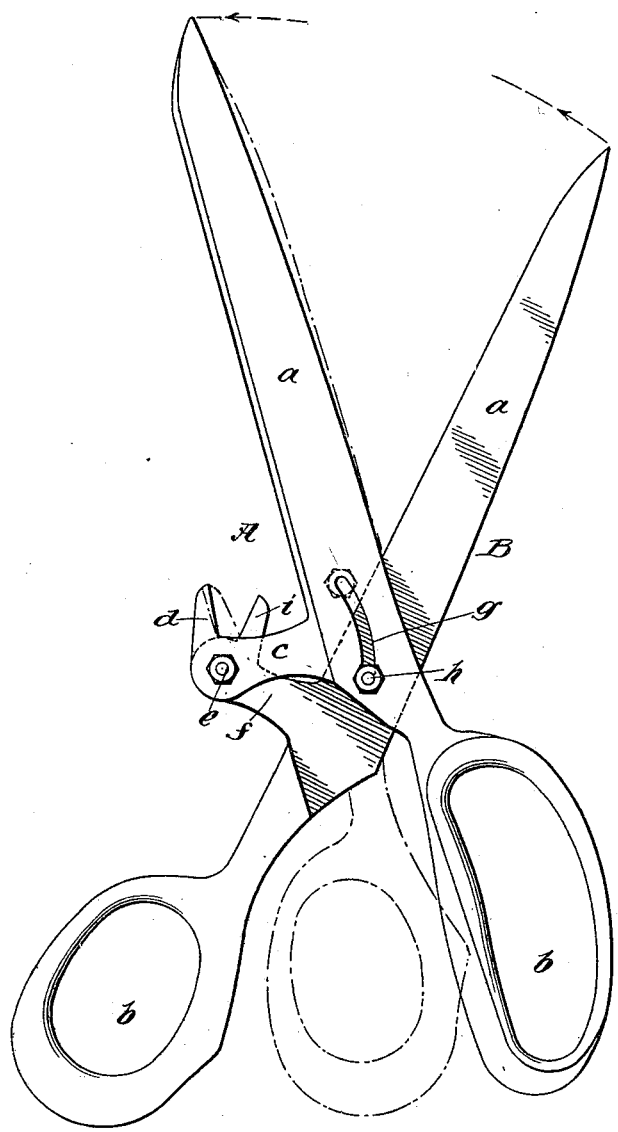
WITNESSES:
Edward Thorpe
J. B. Owens
INVENTOR
J. T. Schnorr
BY
ATTORNEYS

UNITED STATES PATENT OFFICE.

JOHN T. SCHNORR, OF SANDUSKY, OHIO.

SHEARS.

SPECIFICATION forming part of Letters Patent No. 646,238, dated March 27, 1900.

Application filed October 11, 1899. Serial No. 733,267. (No model.)

*To all whom it may concern:*

Be it known that I, JOHN T. SCHNORR, of Sandusky, in the county of Erie and State of Ohio, have invented new and useful Improvements in Shears, of which the following is a full, clear, and exact description.

The purpose of this invention is to provide shears in which the blades will cut true and with a pronounced shear or draw cut and also to prevent the edges crossing each other and being thus worn away, which ends I attain by a peculiar manner of relatively mounting the blades, thus producing shears which are both effective and durable.

This specification is the disclosure of one form of my invention, while the claim defines the actual scope thereof.

Reference is to be had to the accompanying drawing, forming a part of this specification, in which the figure is a plan view of the invention.

The shears are constructed in two sections A and B, each comprising a blade $a$ and a finger-loop $b$. The section A has a transverse projection $c$, formed with a nipper-blade $d$ and carrying the pivot $e$, whereon is mounted a transverse arm or projection $f$ of the section B, so that the shears may be thrown with the blades separated, as shown by full lines in the drawings, or closed, as indicated by the dotted lines. The section A has a slot $g$ formed therein at the base of the arm $c$ and curved concentrically to the pivot $e$. A pin $h$ is fastened to the section B and received in the slot $g$, so as to guide the movements of the sections and cause the blades $a$ to move true together and avoid the crossing and consequent destruction of the edges of the blades. The arm or projection $f$ has a nipper-blade $i$, which works with the nipper-blade $d$. I thus provide shears formed by the blades $a$ for cutting paper, cloth, and like substances, and nippers formed by the blades $d$ and $i$ for cutting wire and other metal. It will thus be seen that I provide a tool which may be put to all uses for which shears and nippers are designed, and that by reason of the peculiar manner of mounting the blades and the consequent draw cut performed less power is required to operate the shears, and the blades will not be crossed and thus destroyed or seriously injured.

Having thus described my invention, I claim as new and desire to secure by Letters Patent—

Shears, having two sections each comprising a blade and a handle, the blade and handle of each section being essentially in alinement, an arm or projection extended laterally from each section and situated at the bases of the blades, the arms being extended in the same direction and the sections being connected by a pivot-pin at the ends of the arms, and a nipper-blade attached to the end of each arm, the blades working with each other as the sections are moved on the pivot.

JOHN T. SCHNORR.

Witnesses:
C. B. WINTERS,
MARGUERITE KEEDY.